(12) United States Patent
Chin et al.

(10) Patent No.: US 12,543,985 B2
(45) Date of Patent: Feb. 10, 2026

(54) ENHANCING EMOTIONAL ACCESSIBILITY OF MEDIA CONTENT

(71) Applicant: Disney Enterprises, Inc., Burbank, CA (US)

(72) Inventors: Elinor Chin, Burbank, CA (US); Lori L. Huck, Los Angeles, CA (US); Lauren Rachel Boros, Manhattan Beach, CA (US); Alexander Niedt, Loma Linda, CA (US); Rebekah Hardwicke, Sherman Oaks, CA (US)

(73) Assignee: Disney Enterprises, Inc., Burbank, CA (US)

( * ) Notice: Subject to any disclaimer, the term of this patent is extended or adjusted under 35 U.S.C. 154(b) by 276 days.

(21) Appl. No.: 18/234,233

(22) Filed: Aug. 15, 2023

(65) Prior Publication Data

US 2025/0057453 A1 Feb. 20, 2025

(51) Int. Cl.
| | |
|---|---|
| *A61B 5/16* | (2006.01) |
| *G06F 3/04815* | (2022.01) |
| *G06F 3/04842* | (2022.01) |
| *G06T 17/00* | (2006.01) |
| *G06V 20/70* | (2022.01) |

(52) U.S. Cl.
CPC .......... *A61B 5/165* (2013.01); *G06F 3/04815* (2013.01); *G06F 3/04842* (2013.01); *G06T 17/00* (2013.01); *G06V 20/70* (2022.01)

(58) Field of Classification Search
None
See application file for complete search history.

(56) References Cited

U.S. PATENT DOCUMENTS

| | | | |
|---|---|---|---|
| 9,767,087 B1* | 9/2017 | Petrov .................... | H04N 21/84 |
| 10,594,757 B1* | 3/2020 | Shevchenko .......... | H04N 7/148 |
| 10,970,329 B1* | 4/2021 | Al Majid ................ | G06F 16/51 |
| 11,375,256 B1* | 6/2022 | Dorner ................... | G06N 3/088 |
| 11,893,720 B1* | 2/2024 | Dutta Choudhury .. | G06V 20/20 |
| 11,922,538 B2* | 3/2024 | Park ........................ | G06T 11/00 |
| 2008/0313227 A1* | 12/2008 | Shafton ................... | G11B 27/11 |
| | | | 707/E17.112 |
| 2008/0313570 A1* | 12/2008 | Shamma ................. | G11B 27/34 |
| | | | 715/846 |

(Continued)

FOREIGN PATENT DOCUMENTS

| | | | | |
|---|---|---|---|---|
| CA | 3150622 A1 * | 9/2022 | ............. | G06V 20/41 |
| CN | 110222210 A * | 9/2019 | ............. | G06F 16/53 |

*Primary Examiner* — Ricky Chin
(74) *Attorney, Agent, or Firm* — Farjami & Farjami LLP

(57) ABSTRACT

A system configured to enhance emotional accessibility of media content depicting one or more characters includes a computing platform having a hardware processor and a memory storing software code. The hardware processor executes the software code to obtain annotation metadata identifying one or more emotions of at least one character, determine, based on the one or more emotions, a mood of the at least one character. The hardware processor further executes the software code to identify, based on the mood of the at least one, one of a plurality of emojis for visually communicating that mood, and generate a visual accompaniment to be displayed in synchronization with displaying the media content to enhance the emotional accessibility of the media content, wherein the visual accompaniment includes the one of the plurality of emojis.

18 Claims, 8 Drawing Sheets

(56) References Cited

U.S. PATENT DOCUMENTS

| | | | |
|---|---|---|---|
| 2010/0251295 A1* | 9/2010 | Amento | H04N 21/485 725/38 |
| 2014/0325546 A1* | 10/2014 | Amento | H04N 21/25866 725/86 |
| 2015/0052462 A1* | 2/2015 | Kulkarni | G06F 3/04817 715/765 |
| 2016/0132231 A1* | 5/2016 | Rathod | G06F 3/16 715/727 |
| 2017/0052946 A1* | 2/2017 | Gu | G06F 40/274 |
| 2018/0077095 A1* | 3/2018 | Deyle | G06T 13/205 |
| 2019/0272330 A1* | 9/2019 | Han | G06F 7/08 |
| 2019/0295056 A1* | 9/2019 | Wright | H04L 51/52 |
| 2019/0318252 A1* | 10/2019 | Shamma | G06V 20/49 |
| 2020/0184306 A1* | 6/2020 | Buhmann | G06N 3/006 |
| 2020/0356234 A1* | 11/2020 | Song | G06F 3/04886 |
| 2021/0137438 A1* | 5/2021 | Salfity | G06V 40/174 |
| 2021/0201550 A1* | 7/2021 | Chen | G06V 20/647 |
| 2021/0263582 A1* | 8/2021 | Nagendran | G06F 3/0346 |
| 2022/0101567 A1* | 3/2022 | DiFrancesco | G10L 15/26 |
| 2022/0132217 A1* | 4/2022 | Aher | G06V 20/41 |
| 2022/0165013 A1* | 5/2022 | Velez | A63F 13/213 |
| 2022/0223064 A1* | 7/2022 | Chauhan | G06F 3/0482 |
| 2022/0254082 A1* | 8/2022 | Bhat | H04N 21/8146 |
| 2022/0343576 A1* | 10/2022 | Marey | G06F 40/47 |
| 2022/0413625 A1* | 12/2022 | Yang | G06F 3/04842 |
| 2023/0007359 A1* | 1/2023 | Aher | G06F 16/7844 |
| 2023/0027035 A1* | 1/2023 | Gagliano | G11B 27/031 |
| 2023/0082635 A1* | 3/2023 | Pandit | G06F 40/274 715/753 |
| 2023/0241496 A1* | 8/2023 | Vaught | A63F 13/497 463/42 |
| 2023/0274481 A1* | 8/2023 | Gustman | G06V 10/945 715/202 |
| 2023/0317246 A1* | 10/2023 | Dhillon | A61B 5/4803 705/2 |
| 2023/0325391 A1* | 10/2023 | Li | G06N 20/00 707/723 |
| 2023/0336694 A1* | 10/2023 | Wexler | G10L 25/63 |
| 2023/0359331 A1* | 11/2023 | Lorrain-Hale | G06Q 10/101 |
| 2024/0086546 A1* | 3/2024 | Cheaz | G06F 21/577 |
| 2024/0298076 A1* | 9/2024 | Kang | H04N 21/4312 |
| 2025/0045372 A1* | 2/2025 | Kopparam | G09C 1/00 |
| 2025/0053735 A1* | 2/2025 | Shevchenko | G06F 40/30 |
| 2025/0056078 A1* | 2/2025 | Hsu | H04N 21/251 |
| 2025/0057453 A1* | 2/2025 | Chin | G06F 3/04817 |

* cited by examiner

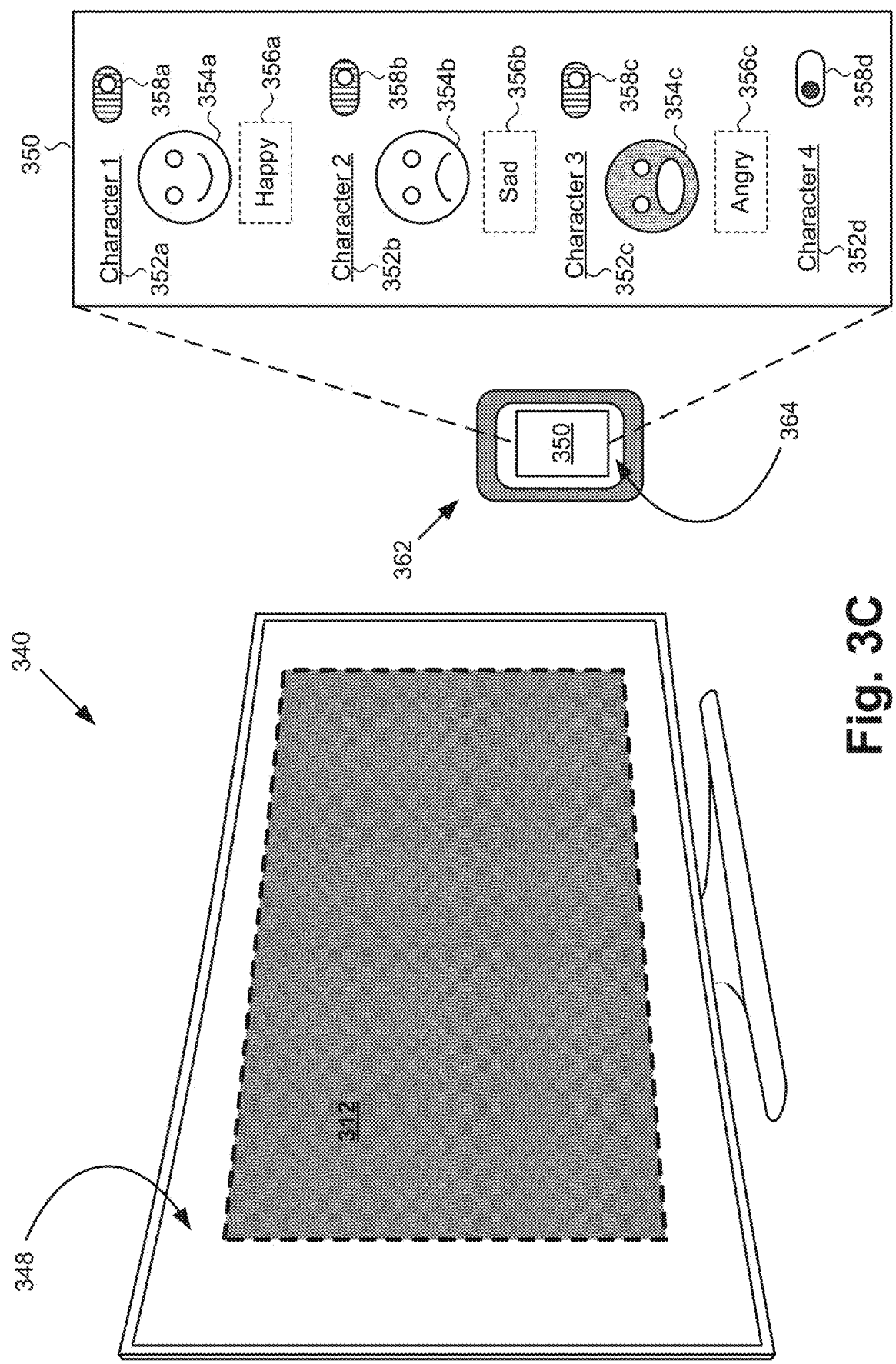

ENHANCING EMOTIONAL ACCESSIBILITY OF MEDIA CONTENT

BACKGROUND

Closed captioning and audio description are commonly used accessibility features for media content. Nevertheless, a significant consumer segment who may be characterized as neurodivergent is subject to a lesser media consumption experience due to a lack of accessibility features catering to their needs.

For example, in 2023, the Centers for Disease Control (CDC) reported that approximately 1 in 36 children in the U.S. is diagnosed with an Autism Spectrum Disorder (ASD). (CDC Report, dated Mar. 24, 2023, titled "Data & Statistics on Autism Spectrum Disorder.") According to statistics, autism prevalence has increased 178% since 2000, and the needs of individuals on the autism spectrum are typically not addressed when providing accessibility features for media content. Like closed captioning for the audio impaired and audio description for the visually impaired, accessibility features providing emotional assistance cues for those with medically diagnosed, or undiagnosed, social impairments could be life changing. Consequently, there is a need for a solution for enhancing emotional accessibility of media content.

BRIEF DESCRIPTION OF THE DRAWINGS

FIG. 3C shows another exemplary implementation in which a visual accompaniment enhancing emotional accessibility of media content is provided to one or more users, but less than all users viewing the media content;

DETAILED DESCRIPTION

Figure 1:
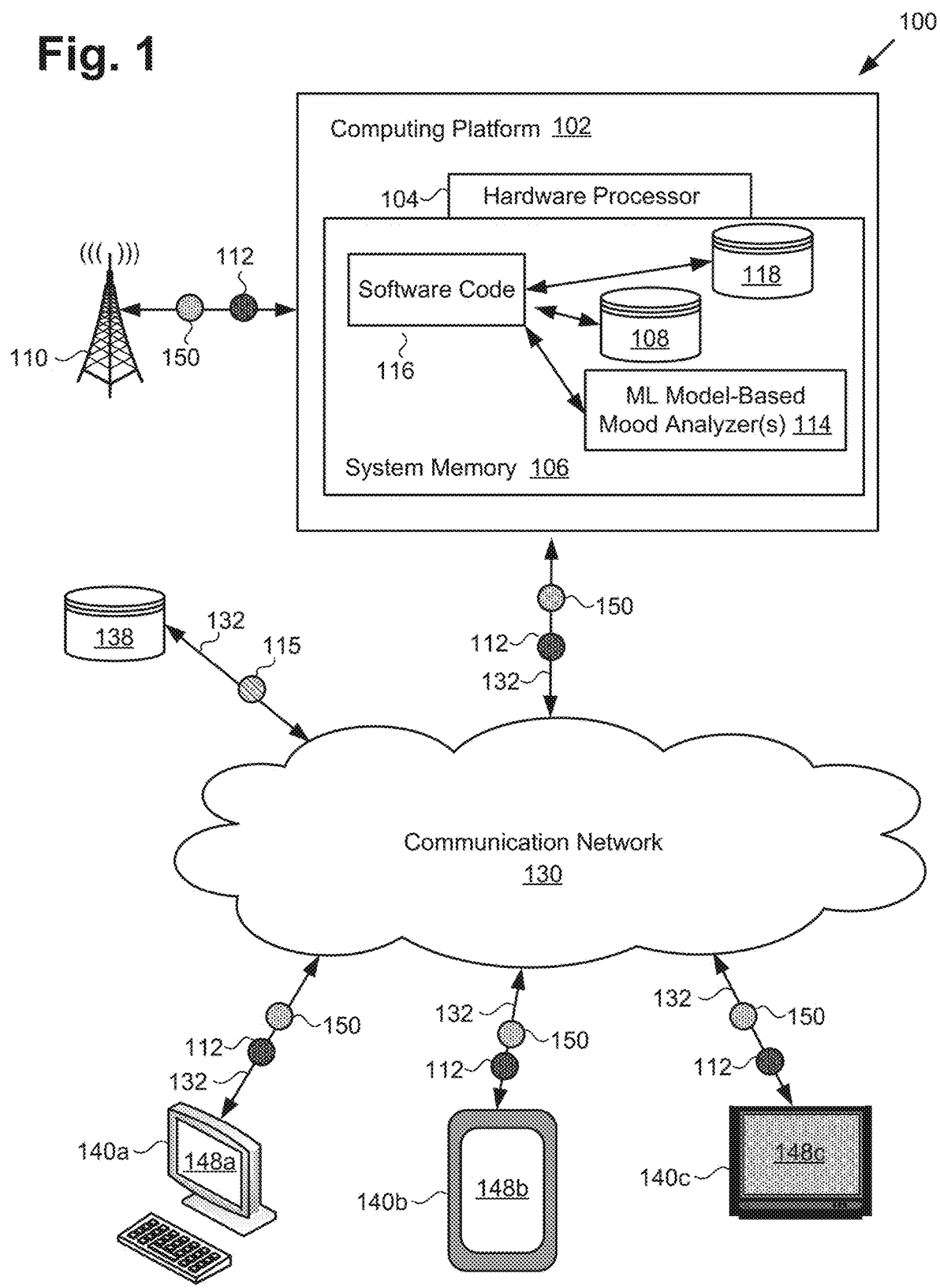
FIG. 1 shows a diagram of an exemplary system for enhancing emotional accessibility of media content, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale and are not intended to correspond to actual relative dimensions.

The present application discloses systems and methods for enhancing emotional accessibility of media content. It is noted that although the present content enhancement solution is described below in detail by reference to audio-video (AV) content having both audio and video components, the present novel and inventive principles may be advantageously applied to video unaccompanied by audio, as well as to audio content unaccompanied by video. In some implementations, the type of media content that is accessibility enhanced according to the present novel and inventive principles may be or include digital representations of persons, fictional characters, locations, objects, and identifiers such as brands and logos, which populate a virtual reality (VR), augmented reality (AR), or mixed reality (MR) environment. Moreover, that media content may depict virtual worlds that can be experienced by any number of users synchronously and persistently, while providing continuity of data such as personal identity, user history, entitlements, possessions, payments, and the like. It is noted that the accessibility enhancement solution disclosed by the present application may also be applied to content that is a hybrid of traditional audio-video and fully immersive VR/AR/MR experiences, such as interactive video.

It is further noted that although the present accessibility solution is described below in detail by reference to the exemplary use case in which emotional accessibility is enhanced, the present novel and inventive principles may be implemented in combination with a suite of other accessibility enhancements. Examples of such accessibility enhancements include: assisted audio, forced narratives, subtitles, and captioning. Moreover, in some implementations, the systems and methods disclosed by the present application may be substantially or fully automated.

As used in the present application, the terms "automation," "automated," and "automating" refer to systems and processes that do not require the participation of a human operator or system administrator. Although in some implementations, a human operator or system administrator may sample or otherwise review the emotional accessibility enhancements generated by the automated systems and according to the automated methods described herein, that human involvement is optional. Thus, the methods described in the present application may be performed under the control of hardware processing components of the disclosed automated systems.

FIG. 1 shows exemplary system 100 for enhancing emotional accessibility of media content, according to one implementation. System 100 includes computing platform 102 having hardware processor 104 and system memory 106 implemented as a computer-readable non-transitory storage medium. According to the present exemplary implementation, system memory 106 stores software code 116, one or more machine learning (ML) model-based mood analyzers 114 (hereinafter "ML model-based mood analyzer(s) 114"), emoji database 108, and character profile database 118.

It is noted that, as defined in the present application, the expression "machine learning model" or "ML model" may refer to a mathematical model for making future predictions based on patterns learned from samples of data or "training data." Various learning algorithms can be used to map correlations between input data and output data. These correlations form the mathematical model that can be used to make future predictions on new input data. Such a predictive model may include one or more logistic regression models, Bayesian models, or neural networks (NNs). Moreover, a "deep neural network." in the context of deep learning, may refer to a NN that utilizes multiple hidden layers between input and output layers, which may allow for learning based on features not explicitly defined in raw data. As used in the present application, a feature identified as a NN refers to a deep neural network. In various implementations, ML models may be trained as classifiers and may be utilized to perform image processing, audio processing, natural-language processing, and other inferential analyses.

As shown in FIG. 1, system 100 is implemented within a use environment including content transmission source 110 providing media content 112 to system 100 and receiving, from system 100, visual accompaniment 150 for enhancing the emotional accessibility of media content 112. As depicted, in some use cases, content transmission source 110 may find it advantageous or desirable to make media content 112 available via an alternative distribution channel, such as communication network 130, which may take the form of a packet-switched network, such as the Internet. For instance, system 100 may be utilized by content transmission source 110 to distribute media content 112 and visual accompaniment 150 for enhancing the emotional accessibility of media content 112 as part of a content stream, which may be an Internet Protocol (IP) content stream provided by a streaming service or a video-on-demand (VOD) service.

The use environment of system 100 also includes user systems 140a. 140b, and 140c (hereinafter "user systems 140a-140c") receiving media content 112 visual accompaniment 150 for enhancing the emotional accessibility of media content 112 from system 100 via communication network 130. Thus, in various implementations, visual enhancement 150 may be transmitted to consumers of media content 112 by content transmission source 110, may be delivered to user systems 140a-140c by system 100 via communication network 130, or may both be transmitted to consumers of media content 112 by content transmission source 110 and delivered to user systems 140a-140c by system 100 via communication network 130.

Also shown in FIG. 1 are annotation database 138, annotation metadata 115, network communication links 132 of communication network 130 interactively connecting system 100 with annotation database 138 and user systems 140a-140c, as well as displays 148a, 148b, and 148c (hereinafter "displays 148a-148c") of respective user systems 140a-140c. As discussed in greater detail below, visual accompaniment 150 includes a plurality of emojis corresponding respectively to moods expressed by one or more characters depicted in media content 112 and selected by a user of any of user systems 140a-140c, as well as, in some implementations, text identifying each mood.

Regarding annotation metadata 115 and annotation database 138, it is noted that, in some implementations, some or all of annotation metadata 115 may accompany media content 112 or may be harvested from media content 112 based on or more analyses of media content 112, as described in detail below by reference to FIG. 5. In other words, in various implementations, annotation metadata 115 may accompany media content 112, may be harvested in all or in part from media content 112, and/or may be obtained in all or in part from annotation database 138.

Although the present application refers to software code 116, ML model-based mood analyzer(s) 114, emoji database 108, and character profile database 118 as being stored in system memory 106 for conceptual clarity, more generally, system memory 106 may take the form of any computer-readable non-transitory storage medium. The expression "computer-readable non-transitory storage medium," in the present application, refers to any medium, excluding a carrier wave or other transitory signal that provides instructions to hardware processor 104 of computing platform 102 or to respective hardware processors of user systems 140a-140c. Thus, a computer-readable non-transitory storage medium may correspond to various types of media, such as volatile media and non-volatile media. Volatile media may include dynamic memory, such as dynamic random access memory (dynamic RAM), while non-volatile memory may include optical, magnetic, or electrostatic storage devices. Common forms of computer-readable non-transitory storage media include: optical discs such as DVDs, RAM, programmable read-only memory (PROM), erasable PROM (EPROM), and FLASH memory.

Moreover, in some implementations, system 100 may utilize a decentralized secure digital ledger in addition to, or in place of, system memory 106. Examples of such decentralized secure digital ledgers may include a blockchain, hashgraph, directed acyclic graph (DAG), and HOLOCHAIN® ledger. In use cases in which the decentralized secure digital ledger is a blockchain ledger, it may be advantageous or desirable for the decentralized secure digital ledger to utilize a consensus mechanism having a proof-of-stake (PoS) protocol, rather than the more energy intensive proof-of-work (PoW) protocol.

Although FIG. 1 depicts software code 116, ML model-based mood analyzer(s) 114, emoji database 108, and character profile database 118 as being co-located in system memory 106, that representation is also provided merely as an aid to conceptual clarity. More generally, system 100 may include one or more computing platforms 102, such as computer servers, which may be co-located, or may form an interactively linked but distributed system, such as a cloud-based system. As a result, hardware processor 104 and system memory 106 may correspond to distributed processor and memory resources within system 100.

Consequently, in some implementations, software code 116, ML model-based mood analyzer(s) 114, emoji database 108, and character profile database 118 may be stored remotely from one another on the distributed memory resources of system 100. It is also noted that, in some implementations, ML model-based mood analyzer(s) may take the form of one or more software modules included in software code 116.

Hardware processor 104 may include multiple hardware processing units, such as one or more central processing units, one or more graphics processing units and one or more tensor processing units, one or more field-programmable gate arrays (FPGAs), custom hardware for machine-learning training or inferencing, and an application programming interface (API) server. By way of definition, as used in the present application, the terms "central processing unit" (CPU). "graphics processing unit" (GPU), and "tensor processing unit" (TPU) have their customary meaning. That is to say, a CPU includes an Arithmetic Logic Unit (ALU) for carrying out the arithmetic and logical operations of computing platform 102, as well as a Control Unit (CU) for retrieving programs, such as software code 116, from system memory 106, while a GPU may be implemented to reduce the processing overhead of the CPU by performing computationally intensive graphics or other processing tasks. A TPU is an application-specific integrated circuit (ASIC) configured specifically for artificial intelligence (AI) processes such as machine learning.

In some implementations, computing platform 102 may correspond to one or more web servers accessible over a packet-switched network such as the Internet. Alternatively, computing platform 102 may correspond to one or more computer servers supporting a wide area network (WAN), a local area network (LAN), or included in another type of private or limited distribution network. In addition, or alternatively, in some implementations system 100 may utilize a local area broadcast method, such as User Datagram Protocol (UDP) or Bluetooth®. System 100 may be implemented virtually, such as in a data center, or implemented in software or virtual machines.

It is further noted that, although user systems 140a-140c are shown variously as desktop computer 140a, smartphone 140b, and smart television (smart TV) 140c, in FIG. 1, those representations are provided merely by way of example. In other implementations, user systems 140a-140c may take the form of any suitable mobile or stationary computing devices or systems that implement data processing capabilities sufficient to provide a user interface, support connections to communication network 130, and implement the functionality ascribed to user systems 140a-140c herein. In other implementations, one or more of user systems 140a-140c may take the form of a laptop computer, tablet computer, digital media player, game console, or a wearable communication device such as a smartwatch, AR device, or VR device (e.g., headset).

It is also noted that displays 148a-148c may take the form of liquid crystal displays (LCDs), light-emitting diode (LED) displays, organic light-emitting diode (OLED) displays, quantum dot (QD) displays, or any other suitable display screens that perform a physical transformation of signals to light. Furthermore, displays 148a-148c may be physically integrated with respective user systems 140a-140c or may be communicatively coupled to but physically separate from respective user systems 140a-140c. For example, where any of user systems 140a-140c is implemented as a smartphone, laptop computer, or tablet computer, its respective display will typically be integrated with that user system. By contrast, where any of user systems 140a-140c is implemented as a desktop computer, its respect display may take the form of a monitor separate from that user system in the form of a computer tower.

In one implementation, content transmission source 110 may be a media entity providing media content 112. Media content 112 may include content from a linear TV program stream, including high-definition (HD) or ultra-HD (UHD) baseband video signal with embedded audio, captions, time code, and other ancillary metadata, such as ratings and/or parental guidelines. In some implementations, media content 112 may also include multiple audio tracks, and may utilize secondary audio programming (SAP) and/or Descriptive Video Service (DVS). Alternatively, in some implementations, media content 112 may be video game content. As noted above, in some implementations media content 112 may be or include digital representations of persons, fictional characters, locations, objects, and identifiers such as brands and logos, which populate a VR, AR, or MR environment. As also noted above, in some implementations media content 112 may depict virtual worlds that can be experienced by any number of users synchronously and persistently, while providing continuity of data such as personal identity, user history, entitlements, possessions, payments, and the like. As also noted above, media content 112 may be or include content that is a hybrid of traditional audio-video and fully immersive VR/AR/MR experiences, such as interactive video.

In some implementations, media content 112 may be the same source video that is broadcast to a traditional TV audience. Thus, content transmission source 110 may take the form of a conventional cable and/or satellite TV network. As noted above, content transmission source 110 may find it advantageous or desirable to make media content 112 available via an alternative distribution channel, such as by being streamed via communication network 130 in the form of a packet-switched network, such as the Internet. Alternatively, or in addition, although not depicted in FIG. 1, in some use cases media content 112 and visual accompaniment 150 for enhancing the emotional accessibility of media content 112 may be distributed on a physical medium, such as a DVD, Blu-ray Disc®, or FLASH drive.

Figure 2:
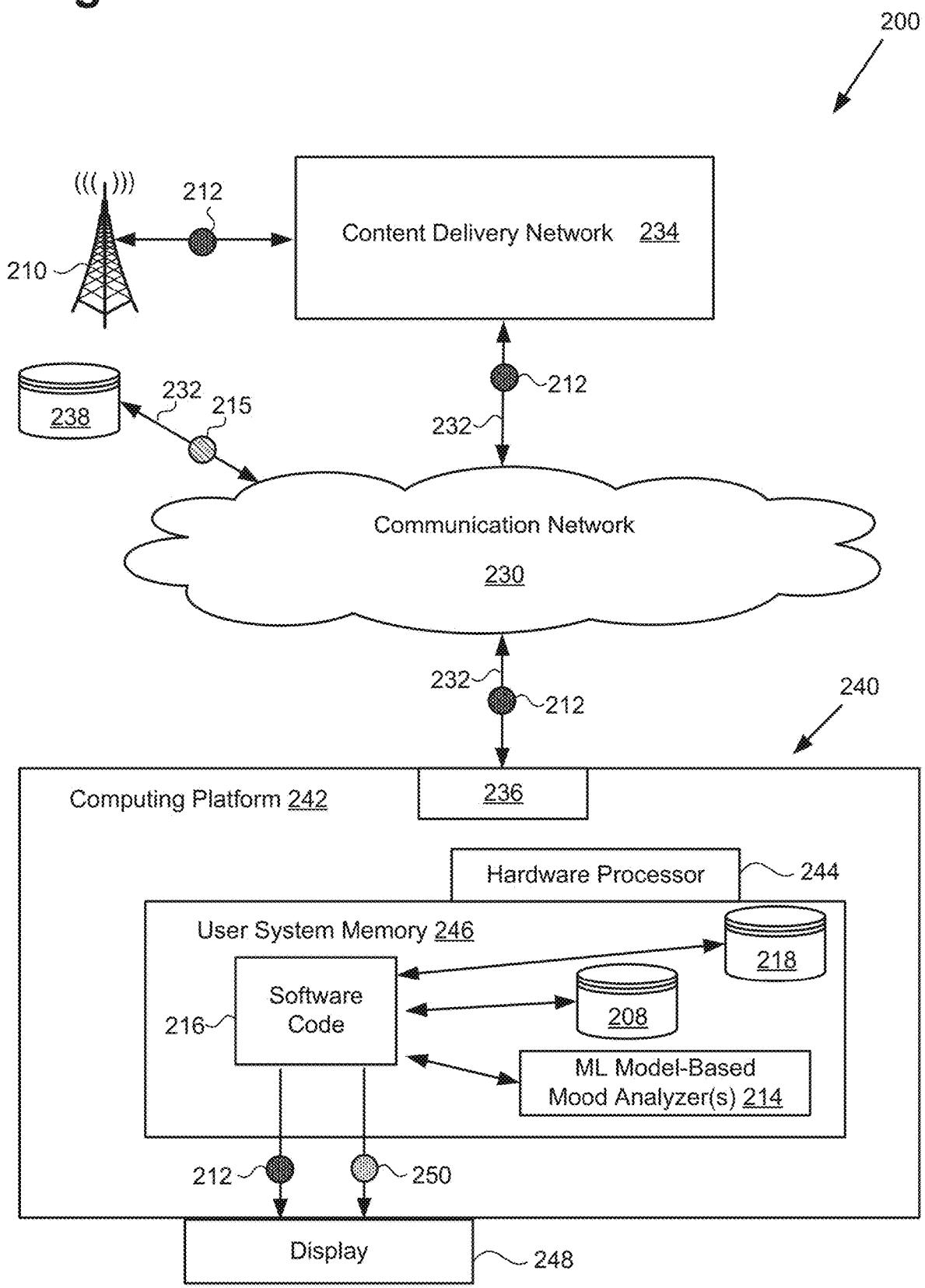
FIG. 2 shows a diagram of another exemplary implementation of a system enhancing emotional accessibility of media content, according to one implementation.

FIG. 2 shows another exemplary system, i.e., user system 240, enhancing emotional accessibility of media content according to one implementation. As shown in FIG. 2, user system 240 includes computing platform 242 having transceiver 236, hardware processor 244, display 248, and user system memory 246 implemented as a computer-readable non-transitory storage medium storing software code 216, one or more ML model-based mood analyzers 214 (hereinafter "ML model-based mood analyzer(s) 214"), emoji database 208, and character profile database 218.

As further shown in FIG. 2, user system 240 is utilized in use environment 200 including annotation database 238 from which annotation metadata 215 may be obtained by user system 240, and content transmission source 210 providing media content 212 to content delivery network (CDN) 234, CDN 234, in turn, distributes media content 212 to user system 240 via communication network 230 and network communication links 232. According to the implementation shown in FIG. 2, software code 216 stored in user system memory 246 of user system 240 is configured to receive media content 212 and to output media content 212 and visual accompaniment 250 for enhancing the emotional accessibility of media content 212 for rendering on display 248.

Content transmission source 210, media content 212, visual accompaniment 250, annotation database 238, annotation metadata 215, communication network 230, and network communication links 232 correspond respectively in general to content transmission source 110, media content 112, visual accompaniment 150, annotation database 138, annotation metadata 115, communication network 130, and network communication links 132, in FIG. 1. In other words, content transmission source 210, media content 212, visual accompaniment 250, annotation database 238, annotation metadata 215, communication network 230, and network communication links 232 may share any of the characteristics attributed to respective content transmission source 110, media content 112, visual accompaniment 150, annotation database 138, annotation metadata 115, communication network 130, and network communication links 132 by the present disclosure, and vice versa.

User system 240 and display 248 correspond respectively in general to any or all of user systems 140a-140c and respective displays 148a-148c in FIG. 1. Thus, user systems 140a-140c and displays 148a-148c may share any of the characteristics attributed to user system 240 and display 248 by the present disclosure, and vice versa. For example, like displays 148a-148c, display 248 may take the form of an LCD, LED display, OLED display, or QD display. Moreover, although not shown in FIG. 1, each of user systems 140a-140c may include features corresponding respectively to computing platform 242, transceiver 236, hardware processor 244, and user system memory 246 storing software code 216, ML model-based mood analyzer(s) 214, emoji database 208, and character profile database 218.

Transceiver 236 may be implemented as a wireless communication unit configured for use with one or more of a variety of wireless communication protocols. For example, transceiver 236 may include a fourth generation (4G) wireless transceiver and/or a 5G wireless transceiver. In addition, or alternatively, transceiver 236 may be configured for communications using one or more of Wireless Fidelity (Wi-Fi®). Worldwide Interoperability for Microwave Access (WiMAX®). Bluetooth®, Bluetooth® low energy (BLE), ZigBee®, radio-frequency identification (RFID), near-field communication (NFC), and 60 GHz wireless communications methods.

User system hardware processor 244 may include multiple hardware processing units, such as one or more CPUs, one or more GPUs, one or more TPUs, and one or more FPGAs, as those features are defined above.

Software code 216 corresponds in general to software code 116, in FIG. 1, and can perform all the operations attributed to software code 116 by the present disclosure. In other words, in implementations in which client hardware processor 244 executes software code 216 stored locally in user system memory 246, user system 240 may perform any of the actions attributed to system 100 by the present disclosure. Thus, in some implementations, software code 216 executed by hardware processor 244 of user system 240 may receive media content 212 and may output media content 212 and visual accompaniment 250 for enhancing the emotional accessibility of media content 212.

Figure 3A:
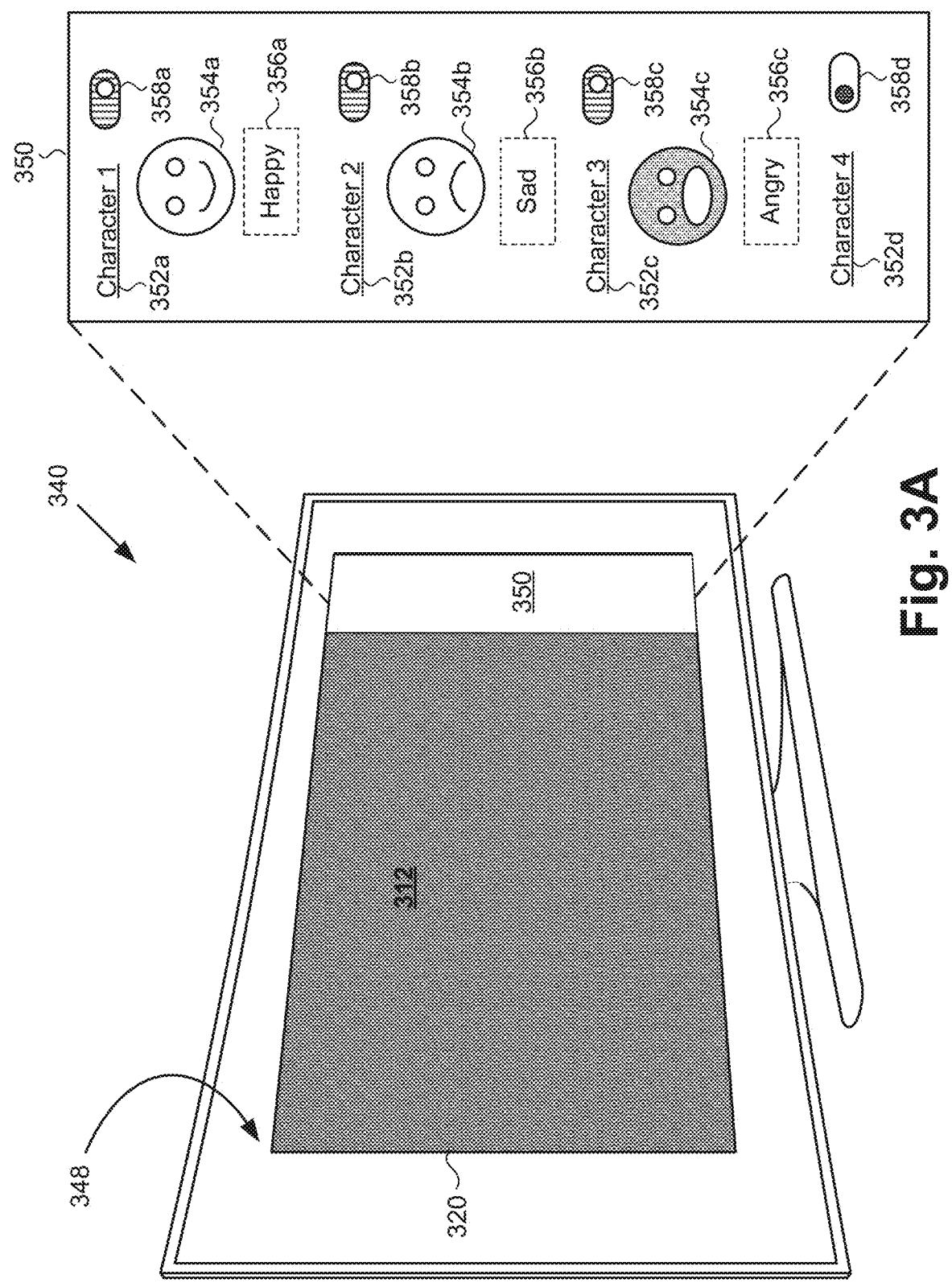
FIG. 3A shows an exemplary implementation in which a visual accompaniment enhancing emotional accessibility of media content is provided to user(s) viewing the media content.

FIG. 3A shows an exemplary implementation in which visual accompaniment 350 for enhancing emotional accessibility of media content 312 is provided to user(s) viewing the media content 312. As shown in FIG. 3A, visual accompaniment 350 is shown as an overlay on media content 312, rendered on display 348 of user system 340. User system 340, display 348, media content 312, and visual accompaniment 350 correspond respectively in general to user system(s) 140a-140c/240, display(s) 148a-148c/248, media content 112/212, and visual accompaniment 150/250 in FIGS. 1 and 2. As a result, user system 340, display 348, media content 312, and visual accompaniment 350 may share any of the characteristics attributed to respective user system(s) 140a-140c/240, display(s) 148a-148c/248, media content 112/212, and visual accompaniment 150/250 by the present disclosure, and vice versa. That is to say, like display(s) 148a-148c/248, display 348 may take the form of an LCD, LED display, OLED display, QD display, or any other suitable display screen that performs a physical transformation of signals to light. In addition, although not shown in FIG. 3A, user system 340 may include features corresponding respectively to user system computing platform 242, transceiver 236, hardware processor 244, and system memory 246 storing software code 216, ML model-based mood analyzer(s) 214, emoji database 208, and character profile database 218, in FIG. 2.

Although visual accompaniment 350 of media content 312, is shown as an overlay of media content 312, in FIG. 3A, that representation is merely exemplary. In other implementations, the display dimensions of media content 312 may be reduced so as to allow visual accompaniment 350 to be rendered next to media content 312, e.g., above, below, or laterally adjacent to media content 312. Alternatively, in some implementations, visual accompaniment 350 may be projected or otherwise displayed on a surface other than display 348, such as a projection screen or wall behind or next to user system 340.

Visual accompaniment 350 for enhancing emotional accessibility of media content 312 identifies characters 352a, 352b. 352c, and 352d depicted in media content 312 and selectable by a user of user system 340. According to the exemplary implementation shown in FIG. 3A, each character is selectable by using toggle switches or other selection tools 358a, 358b. 358c, and 358d displayed by visual accompaniment 350. In the example use case shown in FIG. 3A, characters 352a, 352b, and 352c have been selected, i.e., are turned on, while character 352d has not been selected, i.e., is turned off. Although visual accompaniment 350 depicts an exemplary implementation in which the user of user system 340 selects characters 352a, 352b, and 352c, in some other implementations visual accompaniment 350 may include a default setting, or the user of user system 340 may specify a default setting, such that two lead characters, or any other number of predetermined character types, be displayed unless the user opts to manually select characters.

For each selected or default character, an emoji depicting the present mood of the character is displayed, along with, in some implementations, text identifying that mood. By way of example, at the present playout state of media content 312 on display 348, the mood of character 352a is represented by smiling emoji 354a and is identified by text mood identifier 356a as being happy. Analogously, the mood of character 352b is represented by frowning emoji 354b and is identified by text mood identifier 356b as being sad, while the mood of character 352c is represented by livid and shouting emoji 354c and is identified by text mood identifier 356c as being angry. It is noted that in use cases in which no significant individual characters are present in some portions of media content 312, such as montages, crowd scenes, location scenes, and the like, but those scenes are intended artistically to convey moods, a mood emoji, as well as in some implementations a text mood identifier may be displayed.

It is further noted that non-selected character 352d is not represented by an emoji or a text mood identifier. It is also noted that in various implementations, any or all selected characters 352a, 352b, and 352c may be deselected by a user of user system 340 at any time during display of media content 312 on display 348. Moreover, a non-selected character, such as non-selected character 352d, may be selected by the user at any time during display of media content 312 on display 348. Selection of character 352d would result in character 352d being represented by an emoji representative of the present mood of character 352d, as well as, in some implementations, text identifying that mood and character name. By contrast, deselection of one or more of characters 352a. 352b, and 352c would cause their respective emojis and text mood identifiers to disappear from visual accompaniment 350.

In some implementations, selection or deselection of characters may occur in an initial setup step before media content 312 starts playing, or the user of user system 340 can access the character selection menu at any time during playout of the media content 312. Although visual accompaniment 350 depicts characters 352a, 352b. 352c, 352d being selected or deselected using respective toggle switches 358a, 358b, 358c, and 358d, it is emphasized that in various implementations, characters 352a, 352b, 352c, 352d may be selected or deselected using any other type of selection tool, such as a dropdown menu.

In some implementations selection or deselection of a particular character may change the display arrangement of visual accompaniment 350. For example, deselection of character 352a may cause character 352a to be displayed below selected characters 352b and 352c in visual accompaniment 350, while selection of previously non-selected character 352*d* may cause character 352*d* and its representative emoji and text mood identifier to be displayed above all non-selected and deselected characters. In some other implementations, each emoji corresponding to a character may be displayed adjacent to the depiction of that character on display 348. For example, emoji 354*a* could be displayed adjacent to the depiction of character 352*a* on display 348, emoji 354*b* could be displayed adjacent to the depiction of character 352*b* on display 348, and so forth for each selected or default character. However, in other implementations characters 352*a*, 352*b*. 352*c*, 352*d*, whether selected or deselected, may consistently be displayed at the same location on display 348 to avoid confusing a user of user system 340.

Referring to FIGS. 1 and 3A in combination, in some implementations, hardware processor 104 of computing platform 102 may execute software code 116 to synchronize visual accompaniment 350 to a timecode of media content 112/312, or to video frames or an audio track of media content 112/312. This synchronization may be performed when producing visual accompaniment 150/350 to broadcast or stream media content and visual accompaniment 150/350 to user system 140*a*-140*c*/340, or to record media content and visual accompaniment 150/350 for later broadcasting or streaming to user system 140*a*-140*c*/340. In some of those implementations, the characters displayed by visual accompaniment 150/350 may be predetermined and may be pre-rendered by system 100 and broadcasted or streamed to user system 140*a*-140*c*/340. However, in other implementations in which media content 112/312 and visual accompaniment 150/350 are broadcasted or streamed to user system 140*a*-140*c*/340, hardware processor 104 may execute software code 116 to generate visual accompaniment 150/350 dynamically during the recording, broadcasting, or streaming of media content 112/312.

Referring to FIGS. 2 and 3A in combination, in yet other implementations in which media content 212/312 is broadcasted or streamed to user system 240/340, hardware processor 244 of user system 240/340 may execute software code 216 to generate visual accompaniment 250/350 locally on user system 240/340, and to do so dynamically during playout of media content 212/312. Hardware processor 244 of user system 240/340 may further execute software code 216 to render visual accompaniment 250/350 on display 248/348 in synchronization with and concurrently with rendering media content 212/312.

Figure 3B:
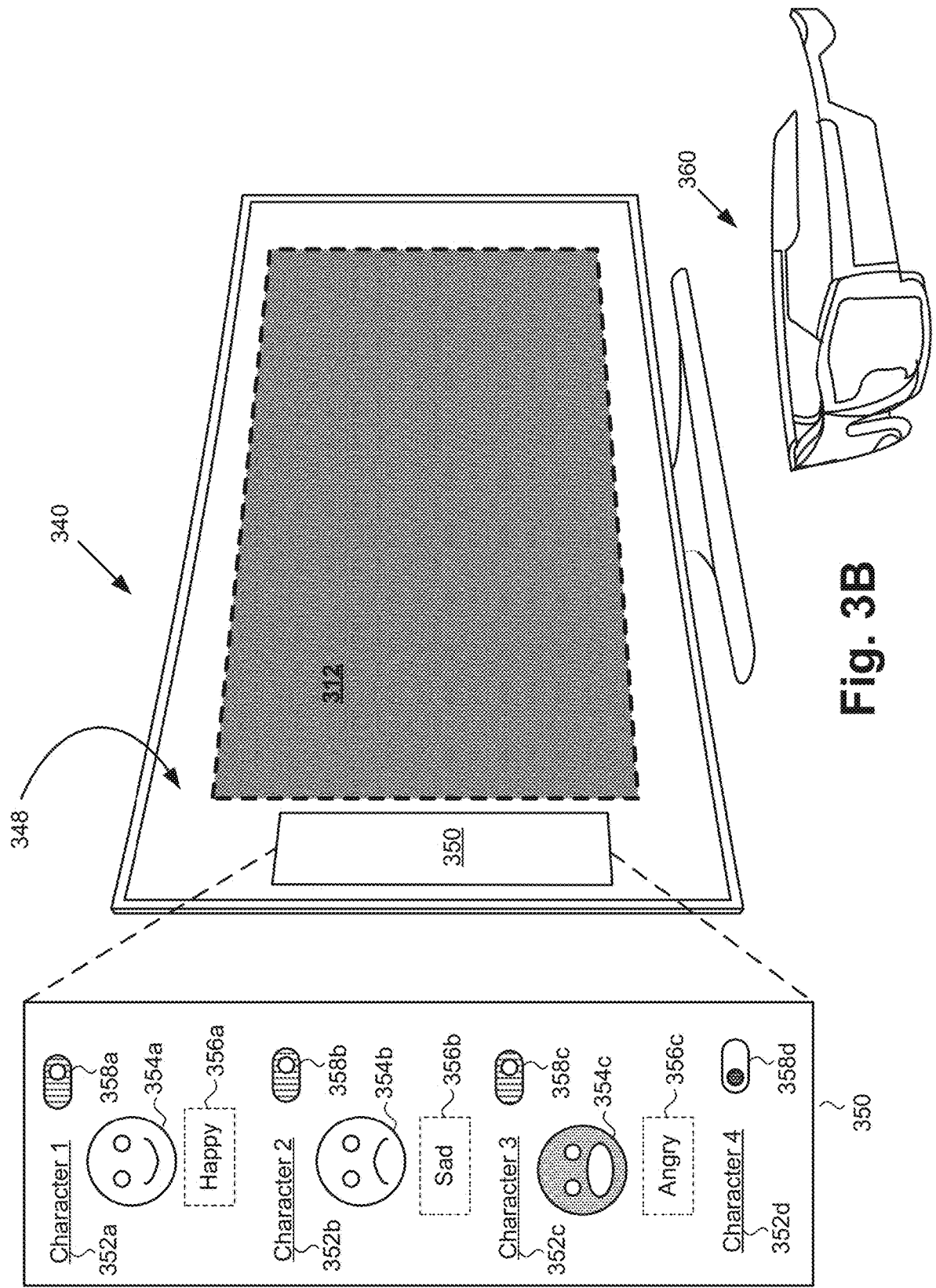
FIG. 3B shows an exemplary implementation in which a visual accompaniment enhancing emotional accessibility of media content is provided to one or more users, but less than all users viewing the media content.

According to the exemplary implementation shown in FIG. 3A, visual accompaniment 350 is rendered on display 348 of user system 340 and is thus concurrently visible to all users viewing the media content 312. However, in some use cases it may be advantageous or desirable to make visual accompaniment 350 visible to one or more users, but less than all the users viewing media content 312 on user system 340. FIG. 3B shows such an implementation, according to one example. In addition to the features shown in FIG. 3A, FIG. 3B includes an AR device 360 for use by a user of user system 340. In the example illustrated in FIG. 3B, AR device 360 is represented by AR glasses. However, it is noted that more generally, AR device 360 may correspond to any AR viewing device (e.g., heads up displays, tethered headsets, etc.). In the implementation shown in FIG. 3B, visual accompaniment 350 is rendered on AR device 360 as an overlay on media content 312 rendered on display 348 (similar to the illustration in FIG. 3A), or outside of media content 312, such as beside media content 312 (as illustrated in FIG. 3B).

In some implementations, visual accompaniment 350 may be generated dynamically during playout of media content 312 and may be transmitted to AR device 360 using a separate communication channel than that used to send and receive media content 312. In one such implementation, the data for use in displaying visual accompaniment 350 may be generated by software code 116 on system 100, and may be transmitted to AR device 360 wirelessly, such as via a 4G or 5G wireless channel. In other implementations, the data for use in displaying visual accompaniment 350 may be generated locally on user system 340 by software code 216, executed by hardware processor 244, and may be transmitted to AR device 360 via one or more of Wi-Fi®. Bluetooth®. ZigBee®, and 60 GHz wireless communications methods.

The implementation shown in FIG. 3B enables one or more users of user system 340 to receive visual accompaniment 350 on respective AR devices 360, while advantageously rendering visual accompaniment 350 undetectable to other users (i.e., users that are not consuming media content 312 using an AR device 360). Alternatively, or in addition, the implementation shown in FIG. 3B advantageously may enable different users to select different characters to follow using visual accompaniment 350. In those implementations, the data for the user selected characters may be transmitted to AR device 360 by system 100 or user system 340. Alternatively, in some implementations, system 100 or user system 340 may render the emojis and text mood identifiers dynamically and in real-time with respect to playout of media content 312 and may output that render to AR device 360.

FIG. 3C shows another exemplary implementation in which visual accompaniment 350 is visible to one or more users, but less than all users viewing media content 312 on user system 340. In addition to the features shown in FIG. 3A, FIG. 3C includes personal communication device 362 including display 364 providing a second display screen for use by a user of user system 340. In the implementation shown in FIG. 3C, visual accompaniment 350 is rendered on display 364 of personal communication device 362 in synchronization with the display of media content 312 on display 348 of user system 340. Synchronization of the display of visual accompaniment 350 on second display 364 with playout of media content 312 on display 348 may be performed periodically, using predetermined time intervals between synchronizations, or may be performed substantially continuously.

Personal communication device 362 may take the form of a smartphone, tablet computer, game console, smartwatch, or other wearable smart device, to name a few examples. Display 364 providing the second display screen for a user of user system 340 may be implemented as an LCD, LED display, OLED, display, QD display, or any other suitable display screen that performs a physical transformation of signals to light.

In some implementations, the data for use in displaying visual accompaniment 350 may be transmitted to personal communication device 362 using a separate communication channel than that used to send and receive media content 312. In one such implementation, the data for use in displaying visual accompaniment 350 may be generated by software code 116 on system 100 and may be transmitted to personal communication device 362 wirelessly, such as via a 4G or 5G wireless channel. In other implementations, the data for use in displaying visual accompaniment 350 may be generated locally on user system 340 by software code 216, executed by hardware processor 244, and may be transmitted to personal communication device 362 via one or more of Wi-Fi®, Bluetooth®, ZigBee®, and 60 GHz wireless communications methods.

As in FIG. 3B, the implementation shown in FIG. 3C enables one or more users of user system 340 to receive visual accompaniment 350 on respective personal communication devices 362, while advantageously rendering visual accompaniment 350 undetectable to other users (i.e., users that are not consuming media content 312 using a personal communication device 362). Alternatively, or in addition, the implementation shown in FIG. 3B advantageously may enable different users to select different characters to follow using visual accompaniment 350. In those implementations, the data for the user selected characters may be transmitted to personal communication device 362 by system 100 or user system 340. Alternatively, in some implementations, system 100 or user system 340 may render the emojis and text mood identifiers dynamically and in real-time with respect to playout of media content 312 and may output that render to personal communication device 362.

Figure 3D:
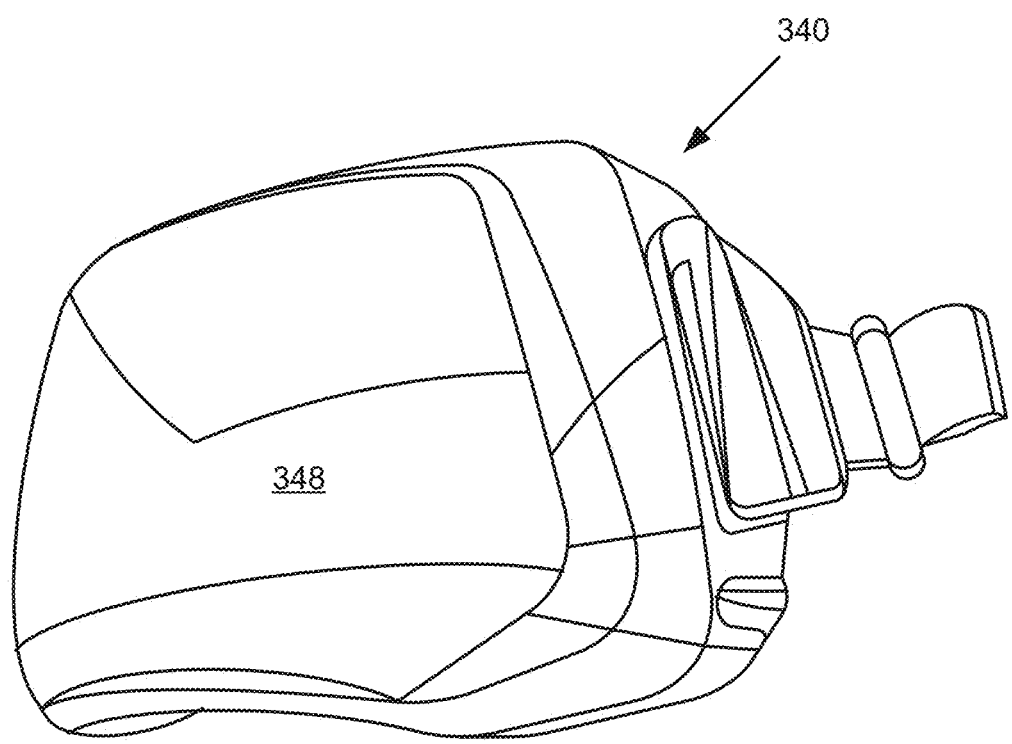
FIG. 3D shows another exemplary system for enhancing emotional accessibility of media content.

FIG. 3D shows an implementation of user system 340 in the form of a VR device (e.g., a standalone or tethered VR headset) including display 348. In various implementations, data for use in displaying visual accompaniment 350 may be transmitted to the VR device using a separate communication channel than that used to send and receive media content 312. In one such implementation, the data for use in displaying visual accompaniment 350 may be generated by software code 116 on system 100, and may be transmitted to the VR device wirelessly, such as via a 4G or 5G wireless channel. In other implementations, the data for use in displaying visual accompaniment 350 may be generated locally on user system 340, by software code 216, executed by hardware processor 244, and may be rendered on display 348 of the VR device.

The implementation shown in FIG. 3D advantageously enables different users to select different characters to follow using visual accompaniment 350. In those implementations, the data for the user selected characters may be transmitted to the VR device by system 100. Alternatively, in some implementations, system 100 or user system 340 may render the emojis and text mood identifiers dynamically and in real-time with respect to playout of media content 312 and may output that render to the VR device by system 100.

It is noted that although FIGS. 3B and 3D are referred to as distinct use cases, in some implementations, at least one of audio or video, and one or more of haptic effects, AR effects, or virtual effects can be used in conjunction with visual accompaniment 350 to enhance the emotional accessibility of an extended reality (XR) experience. It is further noted that, in some implementations, such as a group watch session, some or all of the implementations shown by FIGS. 3A, 3B, 3C, and 3D may be utilized contemporaneously by different users experiencing media content 312 at the same time.

In addition to the exemplary implementations shown in FIGS. 1, 2, 3A, 3B, 3C, and 3D, in some implementations, visual accompaniment 150/250/350 may be rendered for some or all users of user system 140a-140c/240/340 using a lenticular projection technique in which dual video feeds are generated, one presenting media content 112/212/312 and the other presenting visual accompaniment 150/250/350. In some implementations employing such a lenticular technique, visual accompaniment 150/250/350 may be visible to all users of user system 140a-140c/240/340, while in other implementations, customized eyewear could be used to render visual accompaniment 150/250/350 visible only to those users utilizing the customized eyewear.

Figure 4:
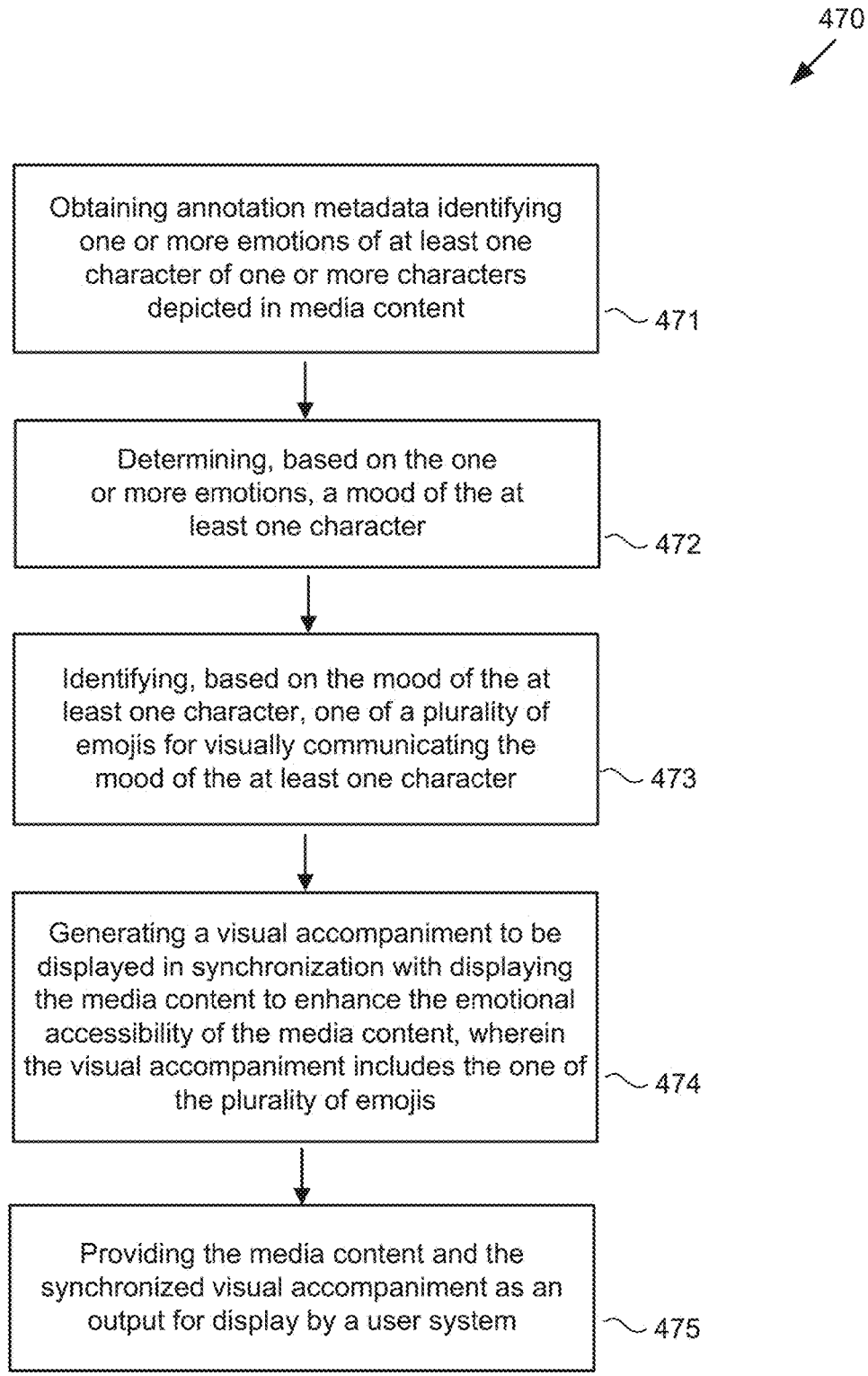
FIG. 4 shows a flowchart outlining an exemplary method for enhancing emotional accessibility of media content, according to one implementation.

The functionality of system 100, user system 140a-140c/240, and software code 116/216 in FIGS. 1 and 2 will be further described by reference to FIGS. 4 and 5. FIG. 4 shows flowchart 470 presenting an exemplary method for enhancing emotional accessibility of media content including a plurality of segments each depicting one or more characters, according to one implementation. With respect to the method outlined in FIG. 4, it is noted that certain details and features have been left out of flowchart 470 in order not to obscure the discussion of the inventive features in the present application.

Figure 5:
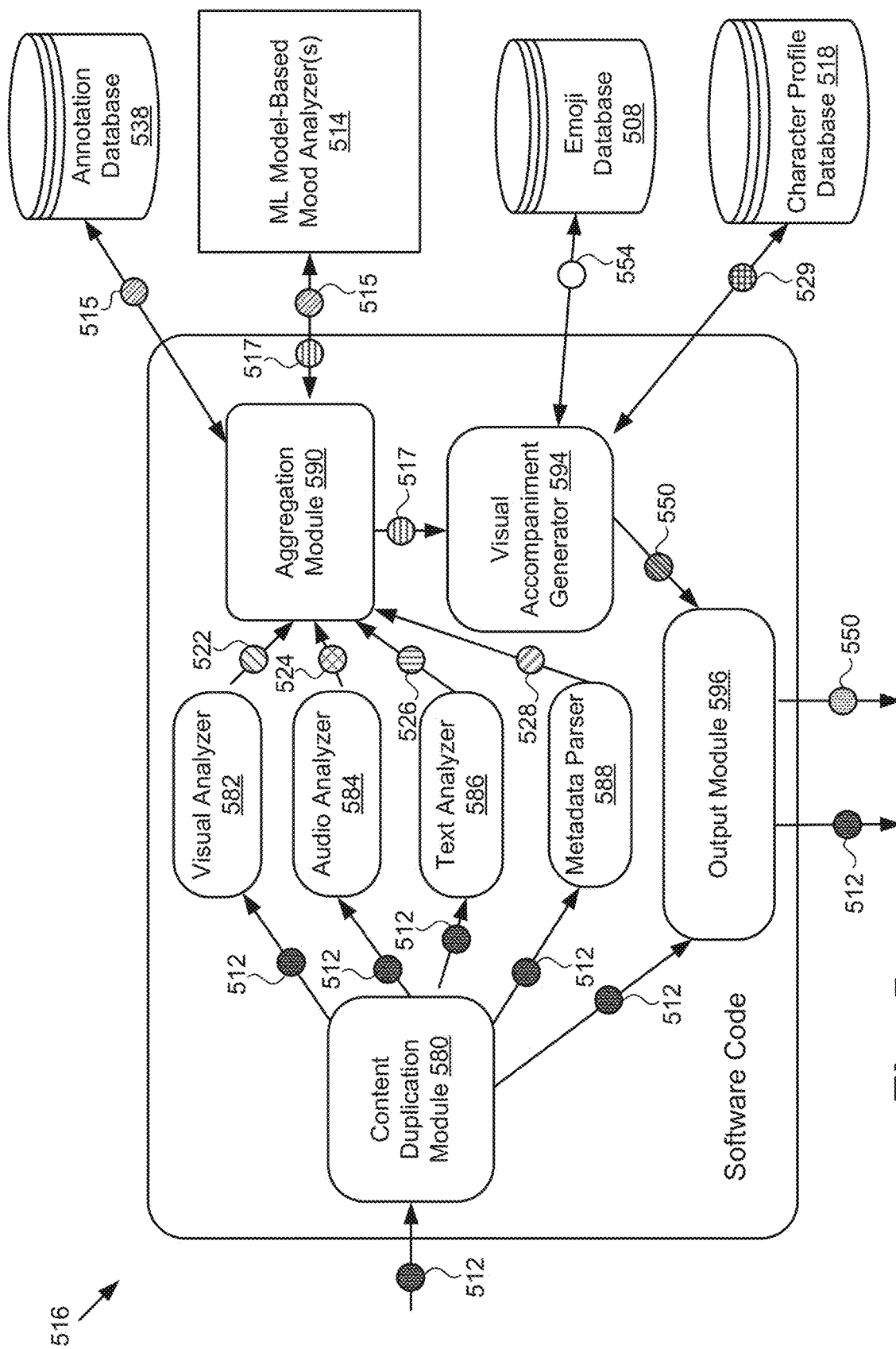
FIG. 5 shows a diagram of an exemplary software code suitable for use by system for enhancing emotional accessibility of media content, according to one implementation.

FIG. 5 shows an exemplary diagram of software code 516 suitable for execution by a system for enhancing emotional accessibility of media content, according to one implementation. As shown in FIG. 5, software code 516 is communicatively coupled to one or more ML model-based mood analyzers 514 (hereinafter "ML model-based mood analyzer(s) 514"), as well as to emoji database 508 storing a plurality of emojis each communicative of a different mood, character profile database 518 storing respective personality profiles of a plurality of characters that may be depicted in media content, and, in some implementations, annotation database 538. As further shown in FIG. 5, software code 516 may include one or more of content duplication module 580, visual analyzer 582, audio analyzer 584, text analyzer 586, metadata parser 588, aggregation module 590, visual accompaniment generator 594, and output module 596.

In addition, FIG. 5 shows media content 512, visual analysis data 522, audio analysis data 524, text analysis data 526, content metadata 528 describing a plurality of characteristics of content 512, such as title information, characters, genre, plot synopsis, time or frame duration and the like, annotation metadata 515, which in some implementations may be included as part of content metadata 528, one or more character moods 517 (hereinafter "mood(s) 517"), emojis 554, character profile data 529, and visual accompaniment 550. It is noted that content metadata 528 and/or annotation metadata 515 may be produced by human annotators or automated annotation systems at the behest of the owner or creator of media content 512, and may be provided by the owner, creator, or distributor of media content 512.

In some implementations, annotation metadata 515 may be obtained from annotation database 538 or parsed from content metadata 528, while in other implementations annotation metadata 515 may be obtained by being harvested from media content 512 by software code 516, and may be obtained as an aggregation of any combination of visual analysis data 522, audio analysis data 524, text analysis data 526, and content metadata 528.

In yet other implementations annotation metadata 515 may be obtained in part from annotation database and may be further obtained in part by being harvested from media content 512 by software code 516.

Media content 512 and visual accompaniment 550 correspond respectively in general to media content 112/212/312 and visual accompaniment 150/250/350 in FIGS. 1, 2, 3A, 3B, and 3C. As a result, media content 512 and visual accompaniment 550 may share any of the characteristics attributed to respective media content 112/212/312 and visual accompaniment 150/250/350 by the present disclosure, and vice versa. Emojis 554 correspond in general to emojis 354a. 354b, and 354c (hereinafter "emojis 354a-354c") in FIGS. 3A, 3B, and 3C. Consequently, emojis 554 may share any of the characteristics attributed to emojis 354a-354c by the present disclosure, and vice versa.

Moreover, software code 516, ML model-based mood analyzer(s) 514, emoji database 508, character profile database 518, and annotation database 538 correspond respectfully in general to software code 116/216, ML model-based mood analyzer(s) 114/214, emoji database 108/208, character profile database 118/218, and annotation database 138/238, in FIGS. 1 and 2. Thus, software code 116/216, ML model-based mood analyzer(s) 114/214, emoji database 108/208, character profile database 118/218, and annotation database 138/238 may share any of the characteristics attributed to respective software code 516, ML model-based mood analyzer(s) 514, emoji database 508, character profile database 518, and annotation database 538 by the present disclosure, and vice versa. For example, like software code 516, software code 116/216 may include features corresponding respectively to content duplication module 580, visual analyzer 582, audio analyzer 584, text analyzer 586, metadata parser 588, aggregation module 590, visual accompaniment generator 594, and output module 596.

Referring to flowchart 470 of FIG. 4 in combination with FIGS. 1, 2, and 5, a method for enhancing the emotional accessibility of media content 112/212/512, which may include a plurality of segments each depicting one or more characters, begins with obtaining annotation metadata 115/215/515 identifying one or more emotions of at least one character of the one or more characters (action 471). Media content 112/212/512 may include content in the form of video games, music videos, animation, movies, or episodic TV content that includes episodes of TV shows that are broadcasted, streamed, or otherwise available for download or purchase on the Internet or via a user application. In addition, or alternatively, as noted above in some implementations media content 112/212/512 may be or include digital representations of persons, fictional characters, locations, objects, and identifiers such as brands and logos, which populate a VR, AR, or MR environment. Moreover, and as further noted above, in some implementations, media content 112/212/512 may depict virtual worlds that can be experienced by any number of users synchronously and persistently, while providing continuity of data such as personal identity, user history, entitlements, possessions, payments, and the like. As also noted above, media content 112/212/512 may be or include content that is a hybrid of traditional audio-video and fully immersive VR/AR/MR experiences, such as interactive video.

With respect to the term "segments" of content included in media content 112/212/512, it is noted that as defined for the purposes of the present application, the term "segment" refers to any cognizable subset of the content included in a media content file. By way of example, in the specific use case in which media content 112/212/512 takes the form of an audio file, a segment of that content may be an audio track of the audio file, or an audio clip within an audio track. In the case of video content or AV content, a segment of content may refer to a shot, scene, or sub-scene of that content. It is further noted that, as defined in the present application, the term "shot," as applied to video or AV content refers to a sequence of frames of video that are captured from a unique camera perspective without cuts or other cinematic transitions. The term "scene," refers to a shot or series of shots that together deliver a single, complete and unified dramatic element of film or video game presentation, or block of action or storytelling within a video game or film.

In some implementations, annotation metadata 115/215/515 identifying the one or more emotions of the at least one character of the one or more characters in each of the plurality of segments of media content 112/212/512 may be obtained by system 100 from annotation database 138/238/538. Referring to FIGS. 1 and 5 in combination, in some of those implementations, annotation metadata 115/515 may be obtained by content enhancement software code 116/516, executed by hardware processor 104 of computing platform 102 via communication network 130 and network communication links 132. In other implementations, referring to FIGS. 2 and 5 in combination, annotation metadata 215/515 may be obtained by user system 240 from annotation database 238/538 via communication network 230 and network communication links 232. In those implementations, annotation metadata 215/515 may be obtained by software code 216/516, executed by hardware processor 244 of user system computing platform 242.

In some implementations, referring to FIGS. 1 and 5 in combination, annotation metadata 115/515 may be obtained by being parsed from content metadata 528 by content enhancement software code 116/516, executed by hardware processor 104 of computing platform 102, and using metadata parser 588. In other implementations, referring to FIGS. 2 and 5 in combination, annotation metadata 215/515 may be obtained by being parsed from content metadata 528 by content enhancement software code 216/516, executed by hardware processor 244 of user system 240, and using metadata parser 588.

While in some implementations, annotation metadata 115/215/515 may simply be obtained from annotation database 138/238/538 or parsed from content metadata 528, in other implementations, as an alternative to being obtained from annotation database 138/238/538 or parsed from content metadata 528, system 100 or user system 240 may be configured to harvest annotation metadata 115/215/515 from media content 112/212/512 directly. For example, hardware processor 104 may execute software code 116/516, or hardware processor 244 may execute software code 216/516 to utilize one or more of visual analyzer 582, audio analyzer 584, text analyzer 586, or metadata parser 588 to execute an analysis of media content 112/212/512. In implementations in which a plurality of analyses of media content 112/212/512 are executed, hardware processor 104 may optionally execute software code 116/516, or hardware processor 244 may optionally execute software code 216/516 to use optional content duplication module 580 to produce one or more copies of media content 112/212/512, thereby advantageously enabling the execution of the plurality of analyses in parallel, i.e., substantially concurrently.

In various implementations, visual analyzer 582 may be configured to apply, to media content 112/212/512, computer vision or other artificial intelligence (AI) techniques for identifying people, characters, or objects, or may be implemented as an NN or other type of ML model. Visual analyzer 582 may be configured or trained to recognize which characters are speaking, as well as the emotional intensity of their delivery. Visual analyzer 582 may be configured or trained to identify humans, characters, or other talking animated objects, and identify (i) emotions or (ii) emotions and strength of conveyance. In various use cases, different implementations of visual analyzer 582 may be used for different types of media content (i.e., specific configuration or training for specific content).

Audio analyzer 584 may also be implemented as an NN or other ML model. As noted above, visual analyzer 582 and audio analyzer 584 may be used in combination to analyze media content 112/212/512. For instance, in analyzing AV content, audio analyzer 584 can be configured or trained to listen to the audio track of the AV content, and its analysis may be verified using visual analyzer 582, or visual analyzer 582 may interpret the video of the AV content, and its analysis may be verified using audio analyzer 584.

In some use cases, media content 112/212/512 may include text. In use cases in which media content 112/212/512 includes text, hardware processor 104 may execute software code 116/516, or hardware processor 244 may execute software code 216/516, to utilize text analyzer 584 to analyze media content 112/212/512. As shown in FIG. 5, in some use cases, media content 112/212/512 may include content metadata 528. In use cases in which media content 112/212/512 includes content metadata 528, hardware processor 104 may execute software code 116/516 or hardware processor 244 may further execute software code 216/516 to utilize metadata parser 588 to extract content metadata 528 from media content 112/212/512.

Although in one implementation annotation metadata 115/215/515 is harvested from media content 112/212/512 using data output by one or more of visual analyzer 582, audio analyzer 584, text analyzer 586, and metadata parser 588 in an automated process, that implementation is merely described by way of example. In other implementations, it may be advantageous or desirable for a human mood analyst to review and approve or correct the data produced by visual analyzer 582, audio analyzer 584, text analyzer 586, and metadata parser 588.

Flowchart 470 further includes determining, based on the one or more emotions identified by annotation metadata 115/215/515, mood(s) 517 of the at least one character (action 472). As defined for the purposes of the present application, the expression "mood" refers to the present emotional state of a character resulting from one or more present emotions of the character, or resulting from a transition between emotions. By way of example, where a character that experienced fear in an immediately previous segment of media content 112/212/512 is no longer fearful in the present segment, the mood of that character might be relief due to the recent and present absence of fear. As another example, where a character concurrently experiences a plurality of emotions, the mood of the character may result from a combination of those emotions. Specifically, for instance, where a character concurrently experiences happiness and sadness, the mood of the character may be bittersweet due to that combination of emotions.

In some implementations, mood(s) 517 may be limited to moods included in a controlled taxonomy of moods, and those moods may be mapped to a controlled set of emojis included in emoji database 108/208/508. In those implementations, even a mood resulting from a combination of emotions, such as bittersweet, may have a predetermined emoji to which it is specifically mapped.

In some implementations, mood(s) 517 of the at least one character determined in action 472 may be determined in part based on an emotional complexity level selectable by a user of system 100 or user system 240. For example, in one implementation, the emotional complexity level selectable by the user may be one of basic, intermediate, and advanced. Basic emotional complexity may require that the mood of the character be determined to match the strongest emotion experienced by the character in each segment, the intermediate emotional complexity level may permit two present or recent emotions to be combined in determining the mood, while the advanced emotional complexity level may permit the combining of more than two present or recent emotions to be combined when determining the mood of the character in each segment.

It is noted that, in some implementations, annotation data 115/215/515 may include a weighting factor for each identified emotion, based for example, on a confidence value associated with detection of the emotion. For example, in use cases in which a user has selected a basic emotional complexity level and the emotions happy and sad are concurrently identified by annotation data 115/215/515 in a segment of media content 112/212/512, the single emotion having the highest weight may be adopted as the mood of the character in that segment. In use cases in which equally weighted emotions are identified by annotation data 115/215/515 a tie breaking criterion based on character profile data 529 of the character may be utilized. For example, in basic emotional complexity use cases in which a typically optimistic and outgoing character is identified by annotation data 115/215/515 as being equally happy and sad, the predominantly sunny personality of that character described by character profile data 529 may result in the emotion happy being adopted as the mood of the character.

The determination of mood(s) 517 of the at least one character in action 472 may be performed by software code 116/516 executed by hardware processor 104, or by software code 216/516 executed by hardware processor 244, both using aggregation module 590 and ML model-based mood analyzer(s) 114/214/514. For example, in some implementations aggregation module 590 may receive one or more of visual analysis data 522, audio analysis data 524, text analysis data 526, and content metadata 528. Aggregation module 590 may then provide annotation metadata 115/215/515 obtained from aggregation of visual analysis data 522, audio analysis data 524, text analysis data 526, and content metadata 528 to ML model-based mood analyzer(s) 114/214/514 for inferencing mood(s) 517 of the at least one character.

Alternatively, in some implementations system 100 or user system 240 may parse annotation data 115/215/515 from content metadata 528, or may obtain annotation data 115/215/515 for use by ML model-based mood analyzer(s) for inferring mood(s) 517 from annotation database 138/238/538. Thus, in various implementations system 100 or user system 240 includes ML model-based mood analyzer(s) 114/214/514, and mood(s) 517 of the at least one character may be determined, in action 472, using ML model-based mood analyzer(s) 114/214/514.

Although in some implementations ML model-based mood analyzer(s) 114/214/514 may determine mood(s) 517 of the at least one character in an automated process, that implementation is merely described by way of example. In other implementations, it may be advantageous or desirable for a human mood analyst to review and approve or correct mood(s) 517 determined using ML model-based mood analyzer(s) 114/214/514.

Flowchart further include identifying, based on mood(s) 517 of the at least one character, one or more of plurality of emojis 554 for visually communicating mood(s) 517 of the at least (action 473). Action 473 may include comparing mood(s) 517 determined in action 472 with entries in emoji database 108/208/508 to identify one or more of plurality of emojis 554 for use in visually communicating mood(s) 517 to a user of system 100 or user system 240. In some implementations, action 473 may be performed by software code 116/516, executed by hardware processor 104 of system 100, and using emoji database 108/508. In other implementations, action 473 may be performed by software code 216/516, executed by hardware processor 244 of user system 240, both using visual accompaniment generator 594 and emoji database 208/508.

In some implementations, the same generic emoji facial features, albeit expressing a variety of different moods, can be used for all characters, as shown by visual representation 350 in FIGS. 3A, 3B, and 3C. However, in other implementations, each character may have a corresponding emoji having unique features. For example, character 352a may be represented by emoji 354a having an appearance or features unique or idiosyncratic to character 352a, character 352b may be represented by emoji 354b having an appearance or features unique or idiosyncratic to character 352b, and so forth.

Referring to FIG. 4 in combination with FIGS. 3A, 3B, and 3C, in addition to FIGS. 1, 2, and 5, flowchart 470 further includes generating visual accompaniment 150/250/350/550 to be displayed in synchronization with displaying media content 112/212/312/512 to enhance the emotional accessibility of the media content media content 112/212/312/512, wherein the visual accompaniment includes the one or more of the plurality of emojis (action 474). Action 474 may be performed by software code 116/516 executed by hardware processor 104 of system 100, or by software code 216/516 executed by hardware processor 244 of user system 240/340, and using visual accompaniment generator 594 and emojis 354a-354c/554.

As noted above by reference to FIG. 3A, in addition to emojis 354a-354c, visual accompaniment 350 may include text, such as text mood identifier 356a, 356b, and 356c for example, accompanying respective emojis 354a-354c and identifying the mood of the at least one character in each of the plurality of segments to which each of emojis 354a-354c corresponds. As noted above, in various implementations, the synchronization of visual accompaniment 350 with media content 312 may be performed by reference to a timecode of media content 312, or to video frames or an audio track of media content 312.

In some implementations, flowchart 470 may conclude with action 474 described above. However, in other implementations, and referring to FIG. 3A in combination with FIGS. 1, 2, 4, and 5, flowchart 470 may further include providing media content 112/212/312/512 and visual accompaniment 150/250/350/550 as an output for display by user system 140a-140c/240/340 (action 475). Action 475 may be performed by software code 116/516 executed by hardware processor 104 of system 100, or by software code 216/516 executed by hardware processor 244 of user system 240/340, and using output module 596.

As discussed above by reference to FIGS. 1 and 3A, in some implementations, hardware processor 104 of system 100 may execute software code 116/516 to synchronize visual accompaniment 150/350/550 with a timecode, video frames, or an audio track of media content 112/212/312/512, and to broadcast or stream media content 112/212/312/512 and visual accompaniment 150/350/550 to user system 140a-140c/340. The synchronization results in the visual accompaniment being displayed concurrently with the segment of the media content to which the visual accompaniment (i.e., emojis and text mood identifier or a character) corresponds. In some of those implementations, visual accompaniment 150/350/550 may be pre-rendered by system 100 and broadcasted or streamed to user system 140a-140c/340. However, in other implementations in which media content 112/312/512 and visual accompaniment 150/350/550 are broadcasted or streamed to user system 140a-140c/340, hardware processor 104 may execute software code 116/516 to generate visual accompaniment 150/350/550 dynamically during the recording, broadcasting, or streaming of media content 112/312/512.

Further referring to FIG. 2, in yet other implementations in which media content 212/312/512 is broadcasted or streamed to user system 240/340, hardware processor 244 of user system 240/340 may execute software code 216/516 to generate visual accompaniment 250/350/550 locally on user system 240/340, and to do so dynamically during playout of media content 212/312/512. Hardware processor 244 of user system 140a-140c/240/340 may further execute software code 216/516 to render the visual accompaniment 150/250/350/550 on display 148a-148c/248/348 concurrently with rendering media content 112/212/312/512 on display 148a-148c/248/348.

As noted above by reference to FIG. 3A, in some implementations, characters 352a, 352b, and 352c for which emojis and text are displayed by visual accompaniment 350 are selectable by a user of user system 340, through use of toggle switches or other selection tools 358a, 358b, 358c, and 358d. As noted above by reference to FIG. 3B, in some implementations, visual accompaniment 350 may be rendered on display 348 of user system 340 such that visual accompaniment 350 is visible to at least one, but not all of a plurality of users concurrently viewing media content 312 on display 348. Moreover, referring to FIG. 3C, in some implementations visual accompaniment 350 or media content 312 and visual accompaniment 350 may be streamed or otherwise transmitted to personal communication device 362 for rendering on a second display, i.e., display 364 of personal communication device 362.

With respect to the method outlined by flowchart 470, it is noted that actions 471, 472, 473, and 474, or actions 471, 472, 473, 474, and 475, may be performed in an automated process from which human participation may be omitted.

Thus, the present application discloses systems and methods for enhancing emotional accessibility of media content. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the implementations described are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system configured to enhance an emotional accessibility of media content depicting one or more characters, the system comprising:
a computing platform including a hardware processor and a system memory storing a software code:
the hardware processor configured to execute the software code to:
obtain annotation metadata identifying one or more emotions of each character selected by a user from among the one or more characters;
determine, based on the one or more emotions of each character selected by the user, a mood of each character selected by the user;
identify, based on the mood of each character selected by the user, one of a plurality of emojis corresponding respectively to the mood of each character selected by the user; and
generate a visual accompaniment to be displayed in synchronization with displaying the media content to enhance the emotional accessibility of the media content, wherein the visual accompaniment includes each one of the plurality of emojis corresponding respectively to the mood of each character selected by the user.

2. The system of claim 1, further comprising:
a display;
wherein the hardware processor is further configured to execute the software code to:
render the media content on the display; and
render the visual accompaniment on the display concurrently and in synchronization with the media content.

3. The system of claim 2, wherein the hardware processor is further configured to execute the software code to:
render the visual accompaniment on the display such that the visual accompaniment is visible to at least one user of a plurality of users viewing the media content on the display, but not to all of the plurality of users.

4. The system of claim 1, wherein the hardware processor is further configured to execute the software code to:
transmit the media content and the visual accompaniment to a device for rendering on a second display,
wherein the device comprises an augmented reality device, a personal communication device, or a virtual reality device.

5. The system of claim 1, wherein determining the mood of each character selected by the user is further based on an emotional complexity level selectable by the user.

6. The system of claim 1, wherein the visual accompaniment displays text identifying the mood of each character selected by the user.

7. The system of claim 1, further comprising at least one machine learning (ML) model-based mood analyzer, wherein the mood of each character selected by the user is determined using the at least one ML model-based mood analyzer.

8. The system of claim 7, wherein obtaining the annotation metadata identifying the one or more emotions of each character selected by the user includes performing at least one of a visual analysis, an audio analysis, or a text analysis of the media content.

9. The system of claim 1, wherein the hardware processor is further configured to execute the software code to:
generate the visual accompaniment for the media content, dynamically, during recording, broadcasting, or streaming of the media content.

10. A method for use by a system configured to enhance an emotional accessibility of media content depicting one or more characters, the system including a computing platform having a hardware processor and a system memory storing a software code, the method comprising:
obtaining, by the software code executed by the hardware processor, annotation metadata identifying one or more emotions of each character selected by a user from among the one or more characters;
determining, by the software code executed by the hardware processor based on the one or more emotions of each character selected by the user, a mood of each character selected by the user;
identifying, by the software code executed by the hardware processor based on the mood of each character selected by the user, one of a plurality of emojis corresponding respectively to the mood of each character selected by the user; and
generating, by the software code executed by the hardware processor, a visual accompaniment to be displayed in synchronization with displaying the media content to enhance the emotional accessibility of the media content, wherein the visual accompaniment includes each one of the plurality of emojis corresponding respectively to the mood of each character selected by the user.

11. The method of claim 10, wherein the system further comprises a display, the method further comprising:
rendering, by the software code executed by the hardware processor, the media content on the display; and
rendering, by the software code executed by the hardware processor, the visual accompaniment on the display concurrently and in synchronization with the media content.

12. The method of claim 11, wherein the visual accompaniment is rendered on the display such that the visual accompaniment is visible to at least one user of a plurality of users viewing the media content on the display, but not to all of the plurality of users.

13. The method of claim 10, further comprising:
transmitting, by the software code executed by the hardware processor, the media content and the visual accompaniment to a device for rendering on a second display,
wherein the device comprises an augmented reality device, a personal communication device, or a virtual reality device.

14. The method of claim 10, wherein determining the mood of each character selected by the user is further based on an emotional complexity level selectable by the user.

15. The method of claim 10, wherein the visual accompaniment displays text identifying the mood of each character selected by the user.

16. The method of claim 10, wherein the system further comprises at least one machine learning (ML) model-based mood analyzer, and wherein determining the mood of each character selected by the user comprises using the at least one ML model-based mood analyzer.

17. The method of claim 16, wherein obtaining the annotation metadata identifying the one or more emotions of each character selected by the user comprises performing at least one of a visual analysis, an audio analysis, or a text analysis of the media content.

18. The method of claim 10, wherein generating the visual accompaniment is performed, dynamically, during recording, broadcasting, or streaming of the media content.

* * * * *